Dec. 11, 1951   J. B. KLUVER   2,578,362
COMBINATION FAUCET
Filed Nov. 19, 1948   2 SHEETS—SHEET 1
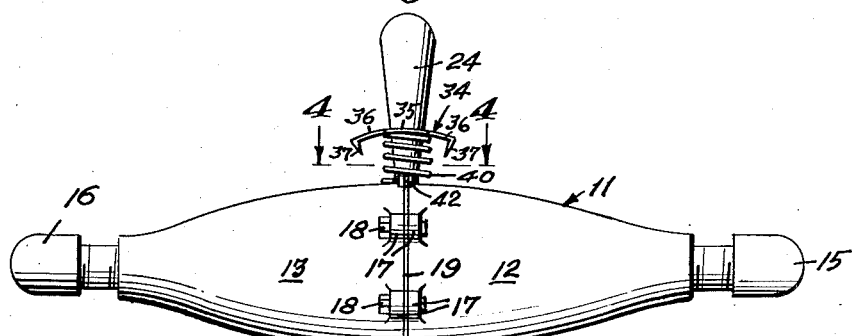
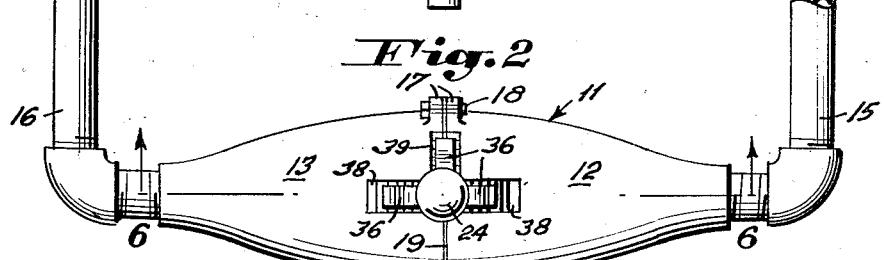
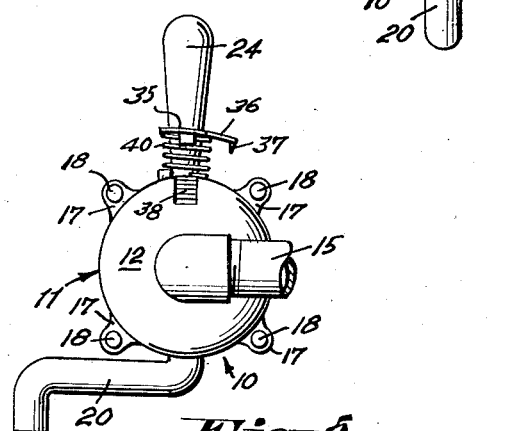
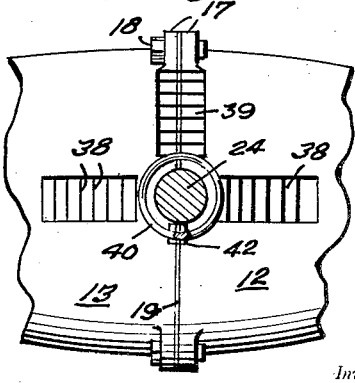
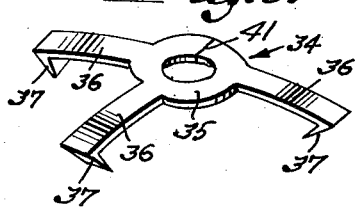
Inventor
James B. Kluver
By John N. Randolph
Attorney

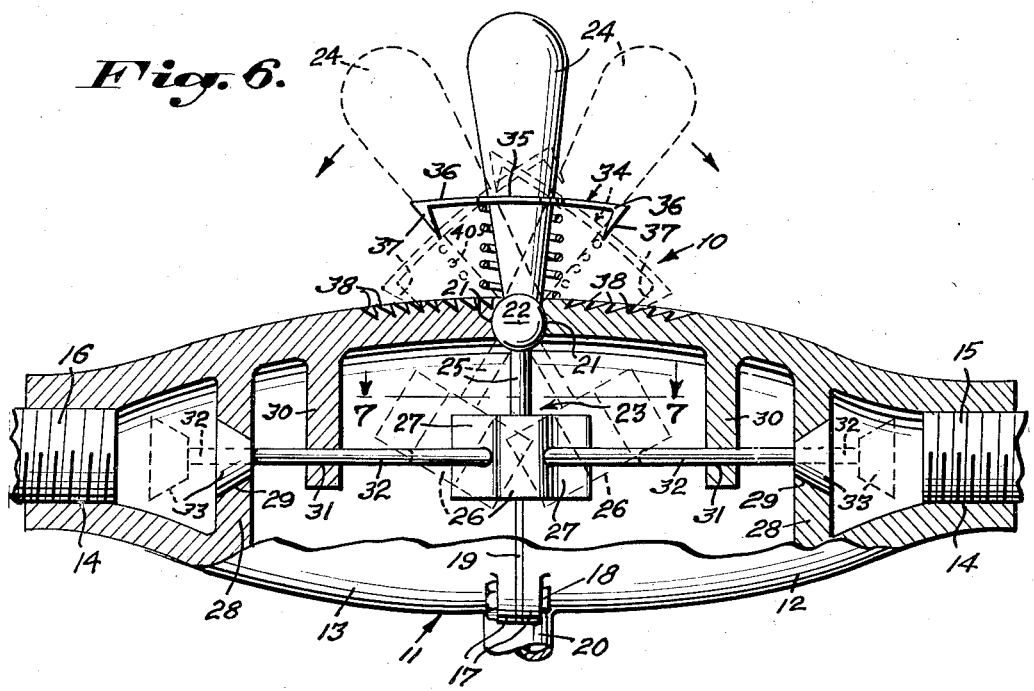

Patented Dec. 11, 1951

2,578,362

UNITED STATES PATENT OFFICE 2,578,362

COMBINATION FAUCET

James B. Kluver, Salem, Oreg., assignor of forty
per cent to Robert A. Schaeffer, Amity, Oreg.

Application November 19, 1948, Serial No. 60,911

7 Claims. (Cl. 277—20)

This invention relates to a novel combination faucet of extremely simple construction having a single bib for both hot and cold water and a single actuating element for admitting either hot or cold water to the faucet or a combination of hot and cold water.

Another object of the invention is to provide a combination faucet wherein the quantities of hot and cold water simultaneously admitted to the faucet may be varied by the manual control or actuator.

Another object of the invention is to provide a faucet having latch means associated with the actuator thereof for maintaining the faucet in an open position and which will normally function to automatically shut off the faucet.

A further and important object of the invention is to provide a faucet having valves which are normally urged to a closed position by the pressure of the water supply with which the faucet is connected and which will additionally function for normally maintaining the faucet in a closed position and without the use of springs or other mechanical actuating means for closing the faucet valves.

Numerous other objects and advantages of the invention will hereinafter become more fully apparent from the following description of the drawings, illustrating a preferred embodiment thereof, and wherein:

Figure 1 is a front elevational view of the faucet;

Figure 2 is a top plan view thereof;

Figure 3 is an end elevational view looking from right to left of Figures 1 and 2;

Figure 4 is an enlarged horizontal sectional view taken substantially along a plane as indicated by the line 4—4 of Figure 1;

Figure 5 is a perspective view of the latch element of the faucet;

Figure 6 is an enlarged longitudinal sectional view taken substantially along a plane as indicated by the line 6—6 of Figure 2;

Figure 7 is a horizontal sectional view taken substantially along a plane as indicated by the line 7—7 of Figure 6, and Figure 8 is a fragmentary perspective view of the faucet actuator.

Referring more specifically to the drawings, the improved combination faucet in its entirety is designated generally 10 and includes a faucet housing, designated generally 11 formed of sections 12 and 13 of corresponding shape and of substantially circular cross section. The sections 12 and 13 taper from their adjacent portions toward their remote ends and the restricted outer ends of said sections are provided with corresponding internally threaded ports 14. The port of the section 12 is adapted to be connected to the threaded outlet end of a cold water conduit 15 and the port 14 of the section 13 is adapted to be connected to a similar hot water conduit 16. The conduits 15 and 16 each include an elbow joint as illustrated in Figure 2. The enlarged adjacent portions of the conduit sections 12 and 13 are provided with complementary apertured ears 17 for receiving detachable fastenings 18 for connecting the sections 12 and 13 together in end-to-end relationship and as illustrated in Figure 7, a sealing gasket 19 is clamped between the adjacent ends of the sections 12 and 13 to provide a liquid tight seal.

The sections 12 and 13 differ in that the section 12, at its enlarged end and lower portion is provided with a bib 20 which may be formed integral therewith or swivelly connected thereto, as is conventional. The upper portions of the adjacent ends of the sections 12 and 13 are provided with opposed corresponding arcuate recesses 21 which are curved circumferentially and radially of the housing 11 and which portions are not engaged by the sealing gasket 19 but provides a socket type seat for a substantially spherical portion 22 of a faucet actuator, designated generally 23 having a handle 24 extending upwardly and outwardly of the housing 11 from said substantially spherical portion 22. The handle 24 is tapered toward the spherical portion 22 and is supported thereby on the housing 11 for swinging movement in any direction. The faucet actuator 23 also includes a stem 25 which extends inwardly of the housing 11 from said spherical portion 22 and which terminates in a head 26 which is formed integral with the stem 25 or may be suitably secured thereto. The head 26 is provided with corresponding, oppositely disposed cam surfaces 27 for a purpose which will hereinafter become apparent.

Each of the housing sections 12 and 13 is provided adjacent its outer, restricted end with a transverse partition or wall 28 having an inwardly tapered port 29 extending therethrough and each of said sections 12 and 13 is provided with an inwardly extending guide member 30 having an opening 31 which aligns with the center of the port 29 and each of which openings is adapted to reciprocally receive a valve stem 32 which extends inwardly therethrough and which is provided at its outer end with a frusto-conical shaped valve 33 which is sized to seat in either one of the ports 29 and which is movable outwardly thereof to an open position. It will be readily apparent that the pressure of the water from the supply conduits 15 and 16 on the outer enlarged ends of the valves 33 will normally retain said valves in a seated position as illustrated in full lines in Figure 6 for closing and sealing the ports 29. As best illustrated in Figure 7, when the valves 33 are thus disposed the inner ends of the valve stems 32 will abut against the cam surfaces 27 adjacent the narrow side or end of the head 26.

A latch member 34 is mounted for sliding and rocking motion on the tapered handle 24 and includes a central annular hub 35 which engages the handle 24 and three arms 36 which project radially from the hub 35, as best seen in Figure 5. Two of the arms 36 are disposed in diametrically opposed relationship to one another and the other arm 36 is disposed equally spaced between the first mentioned arms 36. Each of the arms 36 is provided with a downwardly and inwardly inclined tapered free end 37. The housing sections 12 and 13 are each provided on their upper sides with a longitudinally extending row of teeth 38 which are cut into the exterior surface thereof and the abutting ends of the sections 12 and 13 are provided with a circumferentially extending row of teeth 39 which extend from the handle 24 in a direction rearwardly of the housing 11. The teeth 38 and 39 are all inclined in a direction away from the handle 24 and are adapted to be engaged by the projections 37 of the latch member 34 for latching the valve actuator 23 in various of its dotted line positions of Figure 6 for holding either or both of the valves 33 in open positions, as will hereinafter become apparent. An expansion coiled spring 40 is disposed around the inner end of the handle 24 and has one end thereof bearing on the upper side of the housing 11 and its opposite end bearing against the under or inner side of the latch member 34 for urging said latch member outwardly of the handle 24 until the opening of its hub 35 binds on the tapered handle 24. The spring 40 may be wound around the handle 24 and the latch hub 35 is shown as being split at 41 for application to the handle 24. If the actuator head 26 is detachably fastened to the stem 23 the latch member 34 and spring 40 may be applied to the handle 24 over the stem 25 and spherical portion 22 with the head 26 removed. The section 12 of the housing 11 is provided with an upstanding stop 42 which is disposed in front of the handle 24 to prevent it from being swung forwardly beyond an upright position.

From the foregoing it will be readily apparent that by swinging the handle 24 to the left from its position of Figure 6 will cause the actuator head 26 to be moved to the right for opening the valve 33 of the housing section 12 to admit cold water from the conduit 15 to the central portion of said housing to be discharged through the bib 20. Conversely, by swinging the handle 24 to the right of its full line position of Figure 6, the valve 33 of the housing section 13 will be opened to admit hot water from the conduit 16 in a like manner. Similarly, by swinging the handle 24 rearwardly from its upright position, will cause the actuator head 26 to be displaced forwardly from its full line to its dotted line position of Figure 7 so that the valve stems 32 will be displaced outwardly of the housing 11 by their engagement with the cam surfaces 27 for simultaneously opening both of the valves 33 to admit a mixture of hot and cold water to the central portion of the housing 11 to be dispensed from the bib 20. Likewise, by swinging the handle slightly to the right or left, after it has been swung rearwardly, the proportion of the hot and cold water admitted to the central portion of the housing 11 can be varied. From any of the aforementioned positions, when the handle 24 is released the spring 40 bearing on the latch member 34 will return the handle to its upright position of Figures 1, 2 and 3 and the pressure of the water against the enlarged outer ends of the valves 33 will return said valves to their closed positions and this movement of the valves to closed positions will likewise tend to return the handle 24 to an upright position due to the engagement of the inner ends of the valve stems 32 with the cam portions 27. When the actuator handle 24 is swung either to the right or to the left or to the rear, as previously described, if it is desired to maintain one or the other of the valves 33 or both of said valves in an open position, the latch member 34 can be pressed downwardly against the action of the spring 40 and rocked on the handle 24 sufficiently to engage one of its tapered projections 37 with the teeth of one of the rows of teeth 38 or 39 and due to the inclination of said teeth 38 and 39, the latch 34 will be held thus engaged, as illustrated in dotted lines in Figure 6, until the handle 24 is moved slightly beyond the position in which it is latched to permit the spring 40 to disengage the latch 34 so that the actuator 23 will be automatically returned to its valve releasing position as illustrated in full lines in Figure 6.

Various modifications and changes are contemplated and may obviously be resorted to, without departing from the spirit or scope of the invention as hereinafter defined by the appended claims.

I claim as my invention:

1. A faucet comprising an elongated housing having an inlet port at each end thereof and an outlet intermediate of its ends, one of said inlet ports being adapted to be connected to a hot water supply conduit and the other of said inlet ports being adapted to be connected to a cold water supply conduit, a partition wall adjacent each end of the housing, said partition walls being provided with inwardly tapered ports, a pair of frusto-conical valves normally closing said ports having inwardly extending valve stems, guides in said housing for the valve stems, and a valve actuator including a substantially spherical intermediate portion, said housing having an opening forming a socket for turnably receiving said substantially spherical portion, said valve actuator having an outwardly projecting portion disposed externally of the housing and forming a handle, and a head constituting the opposite end of the valve actuator disposed within said housing and spaced from the spherical portion, said head having oppositely disposed corresponding cam surfaces engaging the inner adjacent ends of the valve stems, said handle being swingable toward either end of the housing for causing the head to move the valve adjacent the opposite end of the housing to an open position, and said handle being swingable in one direction transversely of the housing to cause the cam surfaces to engage the adjacent ends of the valve stems and to exert a thrust against the valve stems in directions in alignment with the axis thereof to move the valve stems away from one another so that both of said valves will be simultaneously opened by engagement of their valve stems with the cam surfaces.

2. A faucet comprising an elongated housing having an inlet port at each end thereof and an outlet intermediate of its ends, one of said inlet ports being adapted to be connected to a hot water supply conduit and the other of said inlet ports being adapted to be connected to a cold water supply conduit, a partition wall adjacent each end of the housing, said partition walls being provided with inwardly tapered ports, a pair of frusto-conical valves normally closing said ports having inwardly extending valve stems, guides in said housing for the valve stems, and a valve actuator including a substantially spherical intermediate portion, said housing having an opening forming a socket for turnably receiving said substantially spherical portion, said valve actuator having an outwardly projecting portion disposed externally of the housing and forming a handle, and a head constituting the opposite end of the valve actuator disposed within said housing, said head having oppositely disposed corresponding cam surfaces engaging the inner ends of the valve stems, said handle being swingable toward either end of the housing for causing the head to move the valve adjacent the opposite end of the housing to an open position, and said handle being swingable in one direction transversely of the housing to cause both of said valves to be simultaneously opened by engagement of their valve stems with the cam surfaces, said housing having rows of outwardly inclined teeth on its exterior surface, and a latch member carried by the handle for detachably and selectively engaging certain of the teeth for releasably retaining the valve actuator in a position for holding either or both of the valves in open positions.

3. A faucet comprising an elongated housing having an inlet port at each end thereof and an outlet intermediate of its ends, one of said inlet ports being adapted to be connected to a hot water supply conduit and the other of said inlet ports being adapted to be connected to a cold water supply conduit, a partition wall adjacent each end of the housing, said partition walls being provided with inwardly tapered ports, a pair of frusto-conical valves normally closing said ports having inwardly extending valve stems, guides in said housing for the valve stems, and a valve actuator including a substantially spherical intermediate portion, said housing having an opening forming a socket for turnably receiving said substantially spherical portion, said valve actuator having an outwardly projecting portion disposed externally of the housing and forming a handle, and a head constituting the opposite end of the valve actuator disposed within said housing, said head having oppositely disposed corresponding cam surfaces engaging the inner ends of the valve stems, said handle being swingable toward either end of the housing for causing the head to move the valve adjacent the opposite end of the housing to an open position, and said handle being swingable in one direction transversely of the housing to cause both of said valves to be simultaneously opened by engagement of their valve stems with the cam surfaces, said housing having rows of outwardly inclined teeth on its exterior surface, and a latch member carried by the handle for detachably and selectively engaging certain of the teeth for releasably retaining the valve actuator in a position for holding either or both of the valves in open positions, said handle being of circular cross section and tapered toward its inner end, said latch member having an annular hub portion for engaging the handle for limited sliding and rocking motion thereon and for binding engagement therewith when the latch member is moved outwardly of the handle a predetermined distance, and said latch member having a plurality of arms projecting radially from the hub portion and each terminating in a tapered projection extending inwardly and toward the housing for engagement with certain of said teeth.

4. A faucet comprising an elongated housing having an inlet port at each end thereof and an outlet intermediate of its ends, one of said inlet ports being adapted to be connected to a hot water supply conduit and the other of said inlet ports being adapted to be connected to a cold water supply conduit, a partition wall adjacent each end of the housing, said partition walls being provided with inwardly tapered ports, a pair of frusto-conical valves normally closing said ports having inwardly extending valve stems, guides in said housing for the valve stems, and a valve actuator including a substantially spherical intermediate portion, said housing having an opening forming a socket for turnably receiving said substantially spherical portion, said valve actuator having an outwardly projecting portion disposed externally of the housing and forming a handle, and a head constituting the opposite end of the valve actuator disposed within said housing, said head having oppositely disposed corresponding cam surfaces engaging the inner ends of the valve stems, said handle being swingable toward either end of the housing for causing the head to move the valve adjacent the opposite end of the housing to an open position, and said handle being swingable in one direction transversely of the housing to cause both of said valves to be simultaneously opened by engagement of their valve stems with the cam surfaces, said housing having rows of outwardly inclined teeth on its exterior surface, and a latch member carried by the handle for detachably and selectively engaging certain of the teeth for releasably retaining the valve actuator in a position for holding either or both of the valves in open positions, said handle being of circular cross section and tapered toward its inner end, said latch member having an annular hub portion for engaging the handle for limited sliding and rocking motion thereon and for binding engagement therewith when the latch member is moved outwardly of the handle a predetermined distance, and said latch member having a plurality of arms projecting radially from the hub portion and each terminating in a tapered projection extending inwardly and toward the housing for engagement with certain of said teeth, and a spring disposed on said handle between the housing and latch member for normally retaining the latch member in a released position and for urging the valve actuator to an inoperative position.

5. A faucet comprising an elongated housing having an inlet port at each end thereof and an outlet intermediate of its ends, one of said inlet ports being adapted to be connected to a hot water supply conduit and the other of said inlet ports being adapted to be connected to a cold water supply conduit, a partition wall adjacent each end of the housing, said partition walls being provided with inwardly tapered ports, a pair of frusto-conical valves normally closing said ports having inwardly extending valve stems, guides in said housing for the valve stems, and a valve actuator including a substantially spherical intermediate portion, said housing having an opening forming a socket for turnably receiving said substantially spherical portion, said valve actuator having an outwardly projecting portion disposed externally of the housing and forming a handle, and a head constituting the opposite end of the valve actuator disposed within said housing, said head having oppositely disposed corresponding cam surfaces engaging the inner ends of the valve stems, said handle being swingable toward either end of the housing for causing the head to move the valve adjacent the opposite end of the housing to an open position, and said handle being swingable in one direction transversely of the housing to cause both of said valves to be simultaneously opened by engagement of their valve stems with the cam surfaces, and spring means for normally urging the valve actuator to an inoperative position.

6. A faucet comprising an elongated housing having an inlet port at each end thereof and an outlet intermediate of its ends, one of said inlet ports being adapted to be connected to a hot water supply conduit and the other of said inlet ports being adapted to be connected to a cold water supply conduit, a partition wall adjacent each end of the housing, said partition walls being provided with inwardly tapered ports, a pair of frusto-conical valves normally closing said ports having inwardly extending valve stems, guides in said housing for the valve stems, and a valve actuator including a substantially spherical intermediate portion, said housing having an opening forming a socket for turnably receiving said substantially spherical portion, said valve actuator having an outwardly projecting portion disposed externally of the housing and forming a handle, and a head constituting the opposite end of the valve actuator disposed within said housing, said head having oppositely disposed corresponding cam surfaces engaging the inner ends of the valve stems, said handle being swingable toward either end of the housing for causing the head to move the valve adjacent the opposite end of the housing to an open position, and said handle being swingable in one direction transversely of the housing to cause both of said valves to be simultaneously opened by engagement of their valve stems with the cam surfaces, latch means carried by the handle for retaining the valve actuator in an operative position, and spring means for normally returning the valve actuator to an inoperative position.

7. A faucet comprising an elongated housing having an inlet port at each end thereof and an outlet port intermediate of its ends, said housing having a restricted bore portion between said outlet and each of the inlets, said restricted bore portions being tapered inwardly of the housing, a valve engaging and normally closing each of said tapered bore portions, said valves being displaceable toward the ends of the housing to assume open positions, a valve stem extending inwardly of the housing from each valve, a valve actuator having one end extending into the intermediate portion of the housing and an opposite, externally disposed handle end, said valve actuator having an intermediate portion mounted for universal swinging movement relatively to the housing, the inner end of said valve actuator being swingable toward either end of the housing for displacing the valve of said housing end out of engagement with its tapered, restricted bore portion and into an open position, and cam means within said housing between the valve actuator and said valve stems, said cam means being actuated by the valve actuator for simultaneously camming the valve stems away from one another for displacing both of the valves into open positions when the inner end of the valve actuator is swung in one direction, said cam means exerting a thrust against the inner end of each valve stem in a direction axially thereof.

JAMES B. KLUVER.

REFERENCES CITED

The following references are of record in the file of this patent:

UNITED STATES PATENTS

| Number | Name | Date |
|---|---|---|
| 963,221 | Haynes | July 5, 1910 |
| 1,822,346 | Guiles | Sept. 8, 1931 |
| 2,205,684 | Cochran | June 25, 1940 |
| 2,372,081 | Holdane | Mar. 20, 1945 |